(12) United States Patent
Katibian et al.

(10) Patent No.: US 8,873,584 B2
(45) Date of Patent: Oct. 28, 2014

(54) DIGITAL DATA INTERFACE DEVICE

(75) Inventors: Behnam Katibian, Irvine, CA (US);
George A Wiley, San Diego, CA (US);
Brian Steele, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1157 days.

(21) Appl. No.: 11/285,379

(22) Filed: Nov. 23, 2005

(65) Prior Publication Data

US 2006/0288133 A1 Dec. 21, 2006

Related U.S. Application Data

(60) Provisional application No. 60/630,853, filed on Nov. 24, 2004, provisional application No. 60/631,549, filed on Nov. 30, 2004, provisional application No. 60/632,825, filed on Dec. 2, 2004, provisional application No. 60/632,852, filed on Dec. 2, 2004, provisional application No. 60/633,071, filed on Dec. 2, 2004, provisional application No. 60/633,084, filed on Dec. 2, 2004.

(51) Int. Cl.
*H04J 3/16* (2006.01)
*H04M 1/725* (2006.01)

(52) U.S. Cl.
CPC .................................. *H04M 1/7253* (2013.01)
USPC ............ 370/472; 370/471; 370/474; 370/503; 370/364; 370/419; 370/389; 370/365; 370/229

(58) Field of Classification Search
USPC .......... 455/557, 559, 556, 418–420; 709/230, 709/233; 370/472, 471, 474, 503, 364, 365, 370/419, 389
See application file for complete search history.

(56) References Cited

U.S. PATENT DOCUMENTS

| | | |
|---|---|---|
| 4,042,783 A | 8/1977 | Gindi |
| 4,363,123 A | 12/1982 | Grover |
| 4,393,444 A | 7/1983 | Weinberg |
| 4,491,943 A | 1/1985 | Iga et al. |
| 4,660,096 A | 4/1987 | Arlan et al. |

(Continued)

FOREIGN PATENT DOCUMENTS

| | | |
|---|---|---|
| CN | 88101302 A | 10/1988 |
| CN | 1155959 A | 7/1997 |

(Continued)

OTHER PUBLICATIONS

Video Electronics Standards Association (VESA), "Mobile Display Digital Interface Standard (MDDI)", Jul. 2004.

(Continued)

*Primary Examiner* — Khai M Nguyen
(74) *Attorney, Agent, or Firm* — Nicholas J. Pauley; Peter Michael Kamarchik; Joseph Agusta

(57) ABSTRACT

The present invention is directed a digital data interface device for transferring digital presentation data at a high rate over a communication link. The digital data interface device includes a message interpreter, content module and a control module. The digital data interface device may include an MDDI link controller. The digital data interface device can be used to control a peripheral device, such as a camera, bar code reader, image scanner, audio device or other sensor. In one example, a cellular telephone having a camera with an MDDI link and a digital data device interface is provided.

31 Claims, 6 Drawing Sheets

(56) References Cited

U.S. PATENT DOCUMENTS

| | | | |
|---|---|---|---|
| 4,764,805 A | 8/1988 | Rabbani et al. | |
| 4,769,761 A | 9/1988 | Downes et al. | |
| 4,812,296 A | 3/1989 | Schmelz et al. | |
| 4,821,296 A | 4/1989 | Cordell | |
| 4,891,805 A | 1/1990 | Fallin | |
| 5,079,693 A | 1/1992 | Miller | |
| 5,111,455 A | 5/1992 | Negus | |
| 5,131,012 A | 7/1992 | Dravida | |
| 5,138,616 A | 8/1992 | Wagner, Jr. et al. | |
| 5,155,590 A | 10/1992 | Beyers, II et al. | |
| 5,167,035 A * | 11/1992 | Mann et al. | 714/4 |
| 5,224,213 A | 6/1993 | Dieffenderfer et al. | |
| 5,227,783 A | 7/1993 | Shaw et al. | |
| 5,231,636 A | 7/1993 | Rasmussen | |
| 5,331,642 A | 7/1994 | Valley et al. | |
| 5,345,542 A | 9/1994 | Wye | |
| 5,359,595 A | 10/1994 | Weddle et al. | |
| 5,377,188 A * | 12/1994 | Seki | 370/390 |
| 5,396,636 A | 3/1995 | Gallagher et al. | |
| 5,418,452 A | 5/1995 | Pyle | |
| 5,418,952 A | 5/1995 | Morley et al. | |
| 5,420,858 A | 5/1995 | Marshall et al. | |
| 5,422,894 A | 6/1995 | Abe et al. | |
| 5,430,486 A | 7/1995 | Fraser et al. | |
| 5,477,534 A | 12/1995 | Kusano | |
| 5,483,185 A | 1/1996 | Scriber et al. | |
| 5,490,247 A | 2/1996 | Tung et al. | |
| 5,502,499 A | 3/1996 | Birch et al. | |
| 5,510,832 A | 4/1996 | Garcia | |
| 5,513,185 A | 4/1996 | Schmidt | |
| 5,519,830 A | 5/1996 | Opoczynski | |
| 5,521,907 A | 5/1996 | Ennis, Jr. et al. | |
| 5,524,007 A | 6/1996 | White et al. | |
| 5,530,704 A | 6/1996 | Gibbons et al. | |
| 5,535,336 A | 7/1996 | Smith et al. | |
| 5,543,939 A | 8/1996 | Harvey et al. | |
| 5,546,121 A | 8/1996 | Gotanda et al. | |
| 5,550,489 A | 8/1996 | Raab | |
| 5,559,459 A | 9/1996 | Back et al. | |
| 5,559,952 A | 9/1996 | Fujimoto | |
| 5,560,022 A | 9/1996 | Dunstan et al. | |
| 5,565,957 A | 10/1996 | Goto | |
| 5,604,450 A | 2/1997 | Borkar et al. | |
| 5,619,650 A | 4/1997 | Bach et al. | |
| 5,621,664 A | 4/1997 | Phaal | |
| 5,646,947 A | 7/1997 | Cooper et al. | |
| 5,664,948 A | 9/1997 | Dimitriadis et al. | |
| 5,680,404 A | 10/1997 | Gray | |
| 5,726,990 A | 3/1998 | Shimada et al. | |
| 5,732,352 A | 3/1998 | Gutowski et al. | |
| 5,733,131 A | 3/1998 | Park | |
| 5,734,118 A | 3/1998 | Ashour et al. | |
| 5,575,951 A | 5/1998 | Ross et al. | |
| 5,751,445 A | 5/1998 | Masunaga | |
| 5,751,951 A | 5/1998 | Osborne et al. | |
| 5,777,999 A | 7/1998 | Hiraki et al. | |
| 5,790,551 A | 8/1998 | Chan | |
| 5,798,720 A | 8/1998 | Yano et al. | |
| 5,802,351 A | 9/1998 | Frampton | |
| 5,815,507 A | 9/1998 | Vinggaard et al. | |
| 5,816,921 A | 10/1998 | Hosokawa | |
| 5,818,255 A | 10/1998 | New et al. | |
| 5,822,603 A | 10/1998 | Hansen et al. | |
| 5,844,918 A | 12/1998 | Kato | |
| 5,847,752 A | 12/1998 | Sebestyen | |
| 5,862,160 A | 1/1999 | Irvin et al. | |
| 5,864,546 A | 1/1999 | Campanella | |
| 5,867,501 A | 2/1999 | Horst et al. | |
| 5,867,510 A | 2/1999 | Steele | |
| 5,881,262 A | 3/1999 | Abramson et al. | |
| 5,903,281 A | 5/1999 | Chen et al. | |
| 5,935,256 A | 8/1999 | Lesmeister | |
| 5,953,378 A | 9/1999 | Hotani et al. | |
| 5,958,006 A | 9/1999 | Eggleston et al. | |
| 5,963,557 A | 10/1999 | Eng | |
| 5,963,564 A | 10/1999 | Petersen et al. |
| 5,963,979 A | 10/1999 | Inoue et al. |
| 5,969,750 A | 10/1999 | Hsieh et al. |
| 5,982,362 A | 11/1999 | Crater et al. |
| 5,983,261 A | 11/1999 | Riddle |
| 5,990,852 A | 11/1999 | Szamrej |
| 5,990,902 A | 11/1999 | Park |
| 5,995,512 A | 11/1999 | Pogue, Jr. |
| 6,002,709 A | 12/1999 | Hendrickson |
| 6,014,705 A | 1/2000 | Koenck et al. |
| 6,047,380 A | 4/2000 | Nolan et al. |
| 6,049,837 A | 4/2000 | Youngman |
| 6,055,247 A | 4/2000 | Kubota et al. |
| 6,064,649 A | 5/2000 | Johnston |
| 6,078,361 A | 6/2000 | Reddy |
| 6,081,513 A | 6/2000 | Roy |
| 6,091,709 A | 7/2000 | Harrison et al. |
| 6,092,231 A | 7/2000 | Sze |
| 6,097,401 A | 8/2000 | Owen et al. |
| 6,101,601 A | 8/2000 | Matthews et al. |
| 6,117,681 A | 9/2000 | Salmons et al. |
| 6,118,791 A | 9/2000 | Fichou et al. |
| 6,151,067 A | 11/2000 | Suemoto et al. |
| 6,151,320 A | 11/2000 | Shim et al. |
| 6,154,156 A | 11/2000 | Tagato |
| 6,154,466 A | 11/2000 | Iwasaki et al. |
| 6,185,601 B1 | 2/2001 | Wolff |
| 6,192,230 B1 | 2/2001 | Van Bokhorst et al. |
| 6,198,752 B1 | 3/2001 | Lee |
| 6,199,169 B1 | 3/2001 | Voth et al. |
| 6,222,677 B1 | 4/2001 | Budd et al. |
| 6,236,647 B1 | 5/2001 | Amalfitano |
| 6,242,953 B1 | 6/2001 | Thomas |
| 6,243,596 B1 | 6/2001 | Kikinis |
| 6,243,761 B1 | 6/2001 | Mogul et al. |
| 6,246,876 B1 | 6/2001 | Hontzeas |
| 6,252,526 B1 | 6/2001 | Uyehara |
| 6,252,888 B1 | 6/2001 | Fite, Jr. et al. |
| 6,256,509 B1 | 7/2001 | Tanaka et al. |
| 6,288,739 B1 | 9/2001 | Hales et al. |
| 6,297,684 B1 | 10/2001 | Uyehara et al. |
| 6,308,239 B1 | 10/2001 | Osakada et al. |
| 6,335,696 B1 | 1/2002 | Aoyagi et al. |
| 6,359,479 B1 | 3/2002 | Oprescu |
| 6,363,439 B1 | 3/2002 | Battles et al. |
| 6,393,008 B1 | 5/2002 | Cheng et al. |
| 6,397,286 B1 | 5/2002 | Chatenever et al. |
| 6,400,392 B1 | 6/2002 | Yamaguchi et al. |
| 6,400,654 B1 | 6/2002 | Sawamura et al. |
| 6,400,754 B2 | 6/2002 | Fleming et al. |
| 6,421,735 B1 | 7/2002 | Jung et al. |
| 6,429,867 B1 | 8/2002 | Deering |
| 6,430,196 B1 | 8/2002 | Baroudi |
| 6,430,606 B1 | 8/2002 | Haq |
| 6,434,187 B1 | 8/2002 | Beard et al. |
| 6,438,363 B1 | 8/2002 | Feder et al. |
| 6,457,090 B1 | 9/2002 | Young |
| 6,475,245 B2 | 11/2002 | Gersho et al. |
| 6,477,186 B1 | 11/2002 | Nakura et al. |
| 6,480,521 B1 | 11/2002 | Odenwalder et al. |
| 6,483,825 B2 | 11/2002 | Seta |
| 6,487,217 B1 | 11/2002 | Baroudi |
| 6,493,357 B1 | 12/2002 | Fujisaki |
| 6,493,713 B1 | 12/2002 | Kanno |
| 6,493,824 B1 | 12/2002 | Novoa et al. |
| 6,545,979 B1 | 4/2003 | Poulin |
| 6,549,538 B1 | 4/2003 | Beck et al. |
| 6,549,958 B1 | 4/2003 | Kuba |
| 6,574,211 B2 | 6/2003 | Padovani et al. |
| 6,583,809 B1 | 6/2003 | Fujiwara |
| 6,594,304 B2 | 7/2003 | Chan |
| 6,609,167 B1 | 8/2003 | Bastiani et al. |
| 6,611,221 B1 | 8/2003 | Soundarapandian et al. |
| 6,611,503 B1 | 8/2003 | Fitzgerald et al. |
| 6,618,360 B1 | 9/2003 | Scoville et al. |
| 6,621,809 B1 | 9/2003 | Lee et al. |
| 6,621,851 B1 | 9/2003 | Agee et al. |
| 6,636,508 B1 | 10/2003 | Li et al. |
| 6,636,922 B1 | 10/2003 | Bastiani et al. |

(56) References Cited

U.S. PATENT DOCUMENTS

| | | | |
|---|---|---|---|
| 6,662,322 B1 | 12/2003 | Abdelilah et al. |
| 6,690,201 B1 | 2/2004 | Simkins et al. |
| 6,714,233 B2 | 3/2004 | Chihara et al. |
| 6,715,088 B1 | 3/2004 | Togawa |
| 6,728,263 B2 | 4/2004 | Joy et al. |
| 6,738,344 B1 | 5/2004 | Bunton et al. |
| 6,745,364 B2 | 6/2004 | Bhatt et al. |
| 6,754,179 B1 | 6/2004 | Lin |
| 6,760,722 B1 | 7/2004 | Raghunandan |
| 6,760,772 B2 | 7/2004 | Zou et al. |
| 6,760,882 B1 | 7/2004 | Gesbert et al. |
| 6,765,506 B1 | 7/2004 | Lu |
| 6,771,613 B1 | 8/2004 | O'Toole et al. |
| 6,778,493 B1 | 8/2004 | Ishii |
| 6,782,039 B2 | 8/2004 | Alamouti et al. |
| 6,784,941 B1 | 8/2004 | Su et al. |
| 6,791,379 B1 | 9/2004 | Wakayama et al. |
| 6,797,891 B1 | 9/2004 | Blair et al. |
| 6,804,257 B1 * | 10/2004 | Benayoun et al. ............ 370/471 |
| 6,810,084 B1 | 10/2004 | Jun et al. |
| 6,813,638 B1 | 11/2004 | Sevanto et al. |
| 6,816,929 B2 | 11/2004 | Ueda |
| 6,831,685 B1 | 12/2004 | Ueno et al. |
| 6,836,469 B1 | 12/2004 | Wu |
| 6,850,282 B1 | 2/2005 | Makino et al. |
| 6,865,240 B1 | 3/2005 | Kawataka |
| 6,865,609 B1 | 3/2005 | Gubbi et al. |
| 6,865,610 B2 | 3/2005 | Bolosky et al. |
| 6,867,668 B1 | 3/2005 | Dagostino et al. |
| 6,882,361 B1 | 4/2005 | Gaylord |
| 6,886,035 B2 | 4/2005 | Wolff |
| 6,892,071 B2 | 5/2005 | Park et al. |
| 6,894,994 B1 | 5/2005 | Grob et al. |
| 6,895,410 B2 | 5/2005 | Ridge |
| 6,897,891 B2 | 5/2005 | Itsukaichi |
| 6,906,762 B1 | 6/2005 | Witehira |
| 6,927,746 B2 | 8/2005 | Lee et al. |
| 6,944,136 B2 | 9/2005 | Kim et al. |
| 6,947,436 B2 | 9/2005 | Harris et al. |
| 6,950,428 B1 | 9/2005 | Horst et al. |
| 6,956,829 B2 | 10/2005 | Lee |
| 6,973,039 B2 | 12/2005 | Redi et al. |
| 6,973,062 B1 | 12/2005 | Han |
| 6,975,145 B1 | 12/2005 | Vadi et al. |
| 6,990,549 B2 | 1/2006 | Main et al. |
| 6,993,393 B2 | 1/2006 | Von Arx et al. |
| 6,999,432 B2 | 2/2006 | Zhang et al. |
| 7,003,796 B1 | 2/2006 | Humpleman |
| 7,010,607 B1 | 3/2006 | Bunton |
| 7,012,636 B2 | 3/2006 | Hatanaka |
| 7,015,838 B1 | 3/2006 | Groen et al. |
| 7,023,924 B1 | 4/2006 | Keller et al. |
| 7,030,796 B2 | 4/2006 | Shim et al. |
| 7,036,066 B2 | 4/2006 | Weibel et al. |
| 7,042,914 B2 | 5/2006 | Zerbe et al. |
| 7,047,475 B2 | 5/2006 | Sharma et al. |
| 7,051,218 B1 | 5/2006 | Gulick et al. |
| 7,062,264 B2 | 6/2006 | Ko et al. |
| 7,062,579 B2 | 6/2006 | Tateyama et al. |
| 7,068,666 B2 | 6/2006 | Foster et al. |
| 7,095,435 B1 | 8/2006 | Hartman et al. |
| 7,110,420 B2 | 9/2006 | Bashirullah et al. |
| 7,126,945 B2 | 10/2006 | Beach |
| 7,138,989 B2 | 11/2006 | Mendelson et al. |
| 7,143,177 B1 | 11/2006 | Johnson et al. |
| 7,143,207 B2 | 11/2006 | Vogt et al. |
| 7,145,411 B1 | 12/2006 | Blair et al. |
| 7,151,940 B2 | 12/2006 | Diao |
| 7,158,536 B2 | 1/2007 | Ching et al. |
| 7,158,539 B2 | 1/2007 | Zhang et al. |
| 7,161,846 B2 | 1/2007 | Padaparambil |
| 7,165,112 B2 | 1/2007 | Battin et al. |
| 7,178,042 B2 | 2/2007 | Sakagami |
| 7,180,951 B2 | 2/2007 | Chan |
| 7,184,408 B2 | 2/2007 | Denton et al. |
| 7,187,738 B2 | 3/2007 | Naven et al. |
| 7,191,281 B2 | 3/2007 | Bajikar |
| 7,219,294 B2 | 5/2007 | Vogt et al. |
| 7,231,402 B2 | 6/2007 | Dickens |
| 7,251,231 B2 | 7/2007 | Gubbi |
| 7,257,087 B2 | 8/2007 | Grovenburg |
| 7,260,087 B2 | 8/2007 | Bao et al. |
| 7,269,153 B1 | 9/2007 | Schultz et al. |
| 7,274,652 B1 | 9/2007 | Webster et al. |
| 7,278,069 B2 | 10/2007 | Abrosimov et al. |
| 7,284,181 B1 | 10/2007 | Venkatramani |
| 7,301,968 B2 | 11/2007 | Haran et al. |
| 7,310,535 B1 | 12/2007 | MacKenzie et al. |
| 7,315,265 B2 | 1/2008 | Wiley et al. |
| 7,315,520 B2 | 1/2008 | Xue et al. |
| 7,317,754 B1 | 1/2008 | Remy et al. |
| 7,327,735 B2 * | 2/2008 | Robotham et al. ............ 370/394 |
| 7,336,139 B2 | 2/2008 | Blair et al. |
| 7,336,667 B2 | 2/2008 | Allen et al. |
| 7,340,548 B2 | 3/2008 | Love et al. |
| 7,349,973 B2 | 3/2008 | Saito et al. |
| 7,373,155 B2 | 5/2008 | Duan et al. |
| 7,383,350 B1 | 6/2008 | Moore et al. |
| 7,383,399 B2 | 6/2008 | Vogt et al. |
| 7,392,541 B2 | 6/2008 | Largman et al. |
| 7,403,487 B1 | 7/2008 | Foladare et al. |
| 7,403,511 B2 | 7/2008 | Liang et al. |
| 7,405,703 B2 | 7/2008 | Qi et al. |
| 7,412,642 B2 | 8/2008 | Cypher |
| 7,430,001 B2 | 9/2008 | Fujii |
| 7,447,953 B2 | 11/2008 | Vogt et al. |
| 7,451,362 B2 | 11/2008 | Chen et al. |
| 7,487,917 B2 | 2/2009 | Kotlarsky et al. |
| 7,508,760 B2 | 3/2009 | Akiyama et al. |
| 7,515,705 B2 | 4/2009 | Segawa et al. |
| 7,526,323 B2 | 4/2009 | Kim et al. |
| 7,536,598 B2 | 5/2009 | Largman et al. |
| 7,543,326 B2 | 6/2009 | Moni |
| 7,557,633 B2 | 7/2009 | Yu |
| 7,574,113 B2 | 8/2009 | Nagahara et al. |
| 7,595,834 B2 | 9/2009 | Kawai et al. |
| 7,595,835 B2 | 9/2009 | Kosaka et al. |
| 7,634,607 B2 | 12/2009 | Honda |
| 7,643,823 B2 | 1/2010 | Shamoon et al. |
| 7,729,720 B2 | 6/2010 | Suh et al. |
| 7,800,600 B2 | 9/2010 | Komatsu et al. |
| 7,813,451 B2 | 10/2010 | Binder et al. |
| 7,831,127 B2 | 11/2010 | Wilkinson |
| 7,835,280 B2 | 11/2010 | Pang et al. |
| 7,844,296 B2 | 11/2010 | Yuki |
| 7,873,343 B2 | 1/2011 | Gollnick et al. |
| 7,876,821 B2 | 1/2011 | Li et al. |
| 7,877,439 B2 | 1/2011 | Gallou et al. |
| 7,912,503 B2 | 3/2011 | Chang et al. |
| 7,945,143 B2 | 5/2011 | Yahata et al. |
| 7,949,777 B2 | 5/2011 | Wallace et al. |
| 8,031,130 B2 | 10/2011 | Tamura |
| 8,077,634 B2 | 12/2011 | Maggenti et al. |
| 8,325,239 B2 | 12/2012 | Kaplan et al. |
| 2001/0005385 A1 | 6/2001 | Ichiguchi et al. |
| 2001/0012293 A1 | 8/2001 | Petersen et al. |
| 2001/0032295 A1 | 10/2001 | Tsai et al. |
| 2001/0047450 A1 | 11/2001 | Gillingham et al. |
| 2001/0047475 A1 | 11/2001 | Terasaki |
| 2002/0011998 A1 | 1/2002 | Tamura |
| 2002/0045448 A1 | 4/2002 | Park et al. |
| 2002/0071395 A1 | 6/2002 | Redi et al. |
| 2002/0131379 A1 | 9/2002 | Lee et al. |
| 2002/0140845 A1 | 10/2002 | Yoshida et al. |
| 2002/0146024 A1 | 10/2002 | Harris et al. |
| 2002/0188907 A1 | 12/2002 | Kobayashi |
| 2002/0193133 A1 | 12/2002 | Shibutani |
| 2003/0003943 A1 | 1/2003 | Bajikar et al. |
| 2003/0028647 A1 | 2/2003 | Grosu |
| 2003/0033417 A1 | 2/2003 | Zou et al. |
| 2003/0034955 A1 | 2/2003 | Gilder et al. |
| 2003/0035049 A1 | 2/2003 | Dickens et al. |
| 2003/0039212 A1 | 2/2003 | Lloyd et al. |
| 2003/0061431 A1 | 3/2003 | Mears et al. |

(56) References Cited

U.S. PATENT DOCUMENTS

| | | |
|---|---|---|
| 2003/0081557 A1 | 5/2003 | Mettala et al. |
| 2003/0086443 A1 | 5/2003 | Beach et al. |
| 2003/0091056 A1 | 5/2003 | Paul Hulme Walker et al. |
| 2003/0093607 A1 | 5/2003 | Main et al. |
| 2003/0125040 A1 | 7/2003 | Walton et al. |
| 2003/0144006 A1 | 7/2003 | Johansson et al. |
| 2003/0158979 A1 | 8/2003 | Tateyama et al. |
| 2003/0185220 A1 | 10/2003 | Valenci |
| 2003/0191809 A1 | 10/2003 | Mosley et al. |
| 2003/0194018 A1 | 10/2003 | Chang |
| 2003/0235209 A1 | 12/2003 | Garg et al. |
| 2004/0008631 A1 | 1/2004 | Kim |
| 2004/0024920 A1 | 2/2004 | Gulick et al. |
| 2004/0028415 A1 | 2/2004 | Eiselt |
| 2004/0049616 A1 | 3/2004 | Dunstan et al. |
| 2004/0073697 A1* | 4/2004 | Saito et al. ............ 709/233 |
| 2004/0082383 A1 | 4/2004 | Muncaster et al. |
| 2004/0100966 A1 | 5/2004 | Allen, Jr. et al. |
| 2004/0128563 A1 | 7/2004 | Kaushik et al. |
| 2004/0130466 A1 | 7/2004 | Lu et al. |
| 2004/0140459 A1 | 7/2004 | Haigh et al. |
| 2004/0153952 A1 | 8/2004 | Sharma et al. |
| 2004/0176065 A1 | 9/2004 | Liu |
| 2004/0184450 A1 | 9/2004 | Omran |
| 2004/0199652 A1* | 10/2004 | Zou et al. ............ 709/230 |
| 2004/0221315 A1 | 11/2004 | Kobayashi |
| 2004/0260823 A1 | 12/2004 | Tiwari et al. |
| 2005/0012905 A1 | 1/2005 | Morinaga |
| 2005/0020279 A1 | 1/2005 | Markhovsky et al. |
| 2005/0021885 A1 | 1/2005 | Anderson et al. |
| 2005/0033586 A1 | 2/2005 | Savell |
| 2005/0055399 A1 | 3/2005 | Savchuk |
| 2005/0088939 A1 | 4/2005 | Hwang et al. |
| 2005/0091593 A1 | 4/2005 | Peltz |
| 2005/0108611 A1 | 5/2005 | Vogt et al. |
| 2005/0117601 A1 | 6/2005 | Anderson et al. |
| 2005/0120079 A1 | 6/2005 | Anderson et al. |
| 2005/0120208 A1 | 6/2005 | Dobson et al. |
| 2005/0125840 A1 | 6/2005 | Anderson et al. |
| 2005/0135390 A1 | 6/2005 | Anderson et al. |
| 2005/0138260 A1* | 6/2005 | Love ............ 710/306 |
| 2005/0144225 A1* | 6/2005 | Anderson et al. ............ 709/203 |
| 2005/0154599 A1 | 7/2005 | Kopra et al. |
| 2005/0163085 A1 | 7/2005 | Cromer et al. |
| 2005/0163116 A1 | 7/2005 | Anderson et al. |
| 2005/0165970 A1 | 7/2005 | Ching et al. |
| 2005/0184993 A1* | 8/2005 | Ludwin et al. ............ 345/502 |
| 2005/0204057 A1 | 9/2005 | Anderson et al. |
| 2005/0213593 A1 | 9/2005 | Anderson et al. |
| 2005/0216421 A1 | 9/2005 | Barry et al. |
| 2005/0216599 A1 | 9/2005 | Anderson et al. |
| 2005/0216623 A1 | 9/2005 | Dietrich et al. |
| 2005/0248685 A1 | 11/2005 | Seo et al. |
| 2005/0259670 A1 | 11/2005 | Anderson et al. |
| 2005/0265333 A1 | 12/2005 | Coffey et al. |
| 2005/0271072 A1 | 12/2005 | Anderson et al. |
| 2005/0286466 A1 | 12/2005 | Tagg et al. |
| 2006/0004968 A1 | 1/2006 | Vogt et al. |
| 2006/0034301 A1 | 2/2006 | Anderson et al. |
| 2006/0034326 A1 | 2/2006 | Anderson et al. |
| 2006/0120433 A1 | 6/2006 | Baker et al. |
| 2006/0128399 A1 | 6/2006 | Duan et al. |
| 2006/0161691 A1 | 7/2006 | Katibian et al. |
| 2006/0164424 A1 | 7/2006 | Wiley et al. |
| 2006/0168496 A1 | 7/2006 | Steele et al. |
| 2006/0171414 A1 | 8/2006 | Katibian et al. |
| 2006/0179164 A1* | 8/2006 | Katibian et al. ............ 710/1 |
| 2006/0179384 A1 | 8/2006 | Wiley et al. |
| 2006/0212775 A1 | 9/2006 | Cypher et al. |
| 2006/0274031 A1 | 12/2006 | Yuen et al. |
| 2007/0008897 A1 | 1/2007 | Denton et al. |
| 2007/0073949 A1 | 3/2007 | Fredrickson et al. |
| 2007/0098002 A1 | 5/2007 | Liu et al. |
| 2007/0274434 A1 | 11/2007 | Arkas et al. |
| 2008/0036631 A1 | 2/2008 | Musfeldt |
| 2008/0088492 A1 | 4/2008 | Wiley et al. |
| 2008/0129749 A1 | 6/2008 | Wiley et al. |
| 2008/0147951 A1 | 6/2008 | Love |
| 2008/0282296 A1 | 11/2008 | Kawai et al. |
| 2009/0055709 A1 | 2/2009 | Anderson et al. |
| 2009/0070479 A1 | 3/2009 | Anderson et al. |
| 2009/0290628 A1 | 11/2009 | Matsumoto |
| 2010/0128626 A1 | 5/2010 | Anderson et al. |
| 2010/0260055 A1 | 10/2010 | Anderson et al. |
| 2011/0013681 A1 | 1/2011 | Zou et al. |
| 2011/0022719 A1 | 1/2011 | Anderson et al. |
| 2011/0199383 A1 | 8/2011 | Anderson et al. |
| 2011/0199931 A1 | 8/2011 | Anderson et al. |
| 2012/0008642 A1 | 1/2012 | Katibian et al. |

FOREIGN PATENT DOCUMENTS

| | | |
|---|---|---|
| CN | 1234709 A | 11/1999 |
| CN | 1310400 A | 8/2001 |
| CN | 1377194 A | 10/2002 |
| CN | 1467953 A | 1/2004 |
| CN | 1476268 A | 2/2004 |
| EP | 0872085 | 12/1996 |
| EP | 0850522 A2 | 7/1998 |
| EP | 0896318 | 2/1999 |
| EP | 0969676 | 1/2000 |
| EP | 1217602 A2 | 6/2002 |
| EP | 1309151 | 5/2003 |
| EP | 1423778 A2 | 6/2004 |
| EP | 1478137 A1 | 11/2004 |
| EP | 1544743 A2 | 6/2005 |
| EP | 1580964 A1 | 9/2005 |
| EP | 1630784 | 3/2006 |
| EP | 2683204 A1 | 1/2014 |
| FR | 2729528 A1 | 7/1996 |
| GB | 2250668 A | 6/1992 |
| GB | 2265796 A | 10/1993 |
| GB | 2284728 A | 6/1995 |
| JP | 53131709 A | 11/1978 |
| JP | 62132433 A | 6/1987 |
| JP | 64008731 U | 1/1989 |
| JP | H01129371 A | 5/1989 |
| JP | 1314022 A | 12/1989 |
| JP | H0465711 A | 3/1992 |
| JP | 4167715 A | 6/1992 |
| JP | H04181823 A | 6/1992 |
| JP | 4241541 | 8/1992 |
| JP | 5199387 A | 8/1993 |
| JP | 5219141 A | 8/1993 |
| JP | 5260115 A | 10/1993 |
| JP | 6037848 A | 2/1994 |
| JP | 06053973 | 2/1994 |
| JP | 06317829 | 11/1994 |
| JP | 7115352 A | 5/1995 |
| JP | 837490 | 2/1996 |
| JP | H0854481 A | 2/1996 |
| JP | 08-274799 | 10/1996 |
| JP | 09-006725 | 1/1997 |
| JP | H0923243 A | 1/1997 |
| JP | 09230837 A | 9/1997 |
| JP | 09261232 | 10/1997 |
| JP | 9270951 A | 10/1997 |
| JP | 9307457 A | 11/1997 |
| JP | 10200941 | 7/1998 |
| JP | 10234038 A | 9/1998 |
| JP | 10312370 A | 11/1998 |
| JP | 1117710 | 1/1999 |
| JP | 11032041 A | 2/1999 |
| JP | 11122234 A | 4/1999 |
| JP | 11163690 A | 6/1999 |
| JP | 11225182 A | 8/1999 |
| JP | 11225372 A | 8/1999 |
| JP | 11249987 | 9/1999 |
| JP | 11282786 A | 10/1999 |
| JP | 11341363 A | 12/1999 |
| JP | 11355327 A | 12/1999 |
| JP | 2000188626 | 7/2000 |
| JP | 2000183840 A | 8/2000 |
| JP | 2000216843 A | 8/2000 |

(56) References Cited

FOREIGN PATENT DOCUMENTS

| | | |
|---|---|---|
| JP | 2000236260 | 8/2000 |
| JP | 2000278141 A | 10/2000 |
| JP | 2000295667 | 10/2000 |
| JP | 2000324135 A | 11/2000 |
| JP | 2000358033 A | 12/2000 |
| JP | 200144960 | 2/2001 |
| JP | 200194542 | 4/2001 |
| JP | 2001094524 | 4/2001 |
| JP | 2001177746 | 6/2001 |
| JP | 2001222474 A | 8/2001 |
| JP | 2001292146 A | 10/2001 |
| JP | 20011282714 A | 10/2001 |
| JP | 2001306428 | 11/2001 |
| JP | 2001319745 A | 11/2001 |
| JP | 2001320280 | 11/2001 |
| JP | 2001333130 A | 11/2001 |
| JP | 2002500855 A | 1/2002 |
| JP | 2002503065 T | 1/2002 |
| JP | 2002062990 A | 2/2002 |
| JP | 2002208844 A | 7/2002 |
| JP | 2002281007 A | 9/2002 |
| JP | 2002300229 A | 10/2002 |
| JP | 2002300299 A | 10/2002 |
| JP | 2003006143 A | 1/2003 |
| JP | 2003009035 A | 1/2003 |
| JP | 2003044184 A | 2/2003 |
| JP | 2003046595 | 2/2003 |
| JP | 2003046596 A | 2/2003 |
| JP | 2003058271 A | 2/2003 |
| JP | 2003069544 A | 3/2003 |
| JP | 2003076654 A | 3/2003 |
| JP | 2003098583 A | 4/2003 |
| JP | 2003111135 A | 4/2003 |
| JP | 2003167680 | 6/2003 |
| JP | 2003198550 A | 7/2003 |
| JP | 2003255921 A | 9/2003 |
| JP | 2003303068 A | 10/2003 |
| JP | 2004005683 A | 1/2004 |
| JP | 2004007356 A | 1/2004 |
| JP | 2004021613 | 1/2004 |
| JP | 2004046324 A | 2/2004 |
| JP | 2004153620 | 5/2004 |
| JP | 2004242294 A | 8/2004 |
| JP | 2004246023 A | 9/2004 |
| JP | 2004297660 A | 10/2004 |
| JP | 2004531916 T | 10/2004 |
| JP | 2004309623 A | 11/2004 |
| JP | 2004363687 A | 12/2004 |
| JP | 2005107683 A | 4/2005 |
| JP | 2005536167 A | 11/2005 |
| JP | 2005539464 A | 12/2005 |
| KR | 1020060056989 | 5/1999 |
| KR | 199961245 | 9/1999 |
| KR | 0222225 | 10/1999 |
| KR | 1019990082741 | 11/1999 |
| KR | 200039224 | 7/2000 |
| KR | 1999-0058829 | 1/2001 |
| KR | 20010019734 | 3/2001 |
| KR | 20020071226 | 9/2002 |
| KR | 2003-0061001 | 7/2003 |
| KR | 1020047003852 | 5/2004 |
| KR | 2004-69360 | 8/2004 |
| KR | 1020060053050 | 5/2006 |
| KR | 2004-0014170 | 2/2007 |
| RU | 2111619 | 5/1998 |
| RU | 2150791 | 6/2000 |
| RU | 2337497 C2 | 10/2008 |
| TW | 459184 B | 10/2001 |
| TW | 466410 | 12/2001 |
| TW | 488133 B | 5/2002 |
| TW | 507195 | 10/2002 |
| TW | 513636 | 12/2002 |
| TW | 515154 | 12/2002 |
| TW | V529253 | 4/2003 |
| TW | 535372 | 6/2003 |
| TW | 540238 B | 7/2003 |
| TW | 542979 B | 7/2003 |
| TW | 200302008 | 7/2003 |
| TW | 546958 | 8/2003 |
| TW | 552792 B | 9/2003 |
| TW | 200304313 | 9/2003 |
| TW | 563305 B | 11/2003 |
| TW | 569547 B | 1/2004 |
| TW | 595116 B | 6/2004 |
| WO | 9210890 | 6/1992 |
| WO | 9410779 | 5/1994 |
| WO | 9619053 | 6/1996 |
| WO | 96/42158 A1 | 12/1996 |
| WO | 98/02988 A2 | 1/1998 |
| WO | WO9915979 | 4/1999 |
| WO | 9923783 A2 | 5/1999 |
| WO | 0130038 | 4/2001 |
| WO | WO0137484 A2 | 5/2001 |
| WO | WO0138970 A2 | 5/2001 |
| WO | WO0138982 A1 | 5/2001 |
| WO | WO0158162 | 8/2001 |
| WO | 0249314 A1 | 6/2002 |
| WO | WO02098112 | 12/2002 |
| WO | 03023587 A2 | 3/2003 |
| WO | 03040893 | 5/2003 |
| WO | WO03039081 A1 | 5/2003 |
| WO | 03061240 | 7/2003 |
| WO | WO2004015680 | 2/2004 |
| WO | WO2004110021 A2 | 12/2004 |
| WO | WO2005018181 A2 | 2/2005 |
| WO | 2005073955 A1 | 8/2005 |
| WO | 2005088939 | 9/2005 |
| WO | 2005091593 | 9/2005 |
| WO | 2005096594 | 10/2005 |
| WO | 2005122509 | 12/2005 |
| WO | WO2006008067 | 1/2006 |
| WO | 2006058045 | 6/2006 |
| WO | 2006058050 | 6/2006 |
| WO | 2006058051 | 6/2006 |
| WO | 2006058052 | 6/2006 |
| WO | 2006058053 | 6/2006 |
| WO | 2006058067 | 6/2006 |
| WO | 2006058173 | 6/2006 |
| WO | WO2007051186 | 5/2007 |

OTHER PUBLICATIONS

Search Report, dated Nov. 8, 2006, for International Application No. PCT/US05/42415, 8 pages.
Plug and Display Standard, Video Electronics Standards Association (VESA) San Jose, CA (Jun. 11, 1997).
International search report PCT/US05/042643—International Search Authority—US Oct. 5, 2006.
International search report PCT/US05/042402—International Search Authority—US Feb. 20, 2007.
International search report PCT/US05/042436—International Search Authority—US Oct. 2, 2006.
J. Sevanto, "Multimedia messaging service for GPRS and UMTS", IEEE on WCNC, Sep. 1999, pp. 1422-1426, vol. 3.
"V4400," Product Brochure, May 31, 2004.
International Preliminary Report on Patentability PCT/US05/042402 IPEA/US Jun. 19, 2007.
Written Opinion PCT/US05/042402 PCT/US05/042402, International Search Authority US, Feb. 20, 2007.
IEEE STD 1394B;IEEE Standard for High Performance Serial Bus—Amendment 2(Dec. 2002).
Liptak, "Instrument Engineer's Handbook. Third Edition, vol. Three: Process Software and Digital Networks, Section 4.17, Proprietary Networks, pp. 627-637, Boca Raton" CRC Press, Jun. 26, 2002.
VESA Mobile Display Digital Interface, Proposed Standard, Version 1 p. Draft 1 0, Aug. 13, 2003. pp. 76-151.
VESA Mobile Display Digital Interface, Proposed Standard, Version 1P, Draft 14, Oct. 29, 2003, pp. 76-158.
VESA Mobile Display Digital Interface, Proposed Standard: Version 1P, Draft 10, Aug. 13, 2003, pp. 1-75.
VESA Mobile Display Digital Interface, Proposed Standard: Version 1P, Draft 13, Oct. 15, 2003, pp. 76-154.

(56) References Cited

OTHER PUBLICATIONS

VESA Mobile Display Digital Interface, Proposed Standard: Version 1P, Draft 15, Nov. 12, 2003, pp. 1-75.
VESA Mobile Display Digital Interface, Proposed Standard: Version 1P, Draft 15, Nov. 12, 2003, pp. 76-160.
VESA Mobile Display Digital Interface, Proposed Standard; Version 1P, Draft 11, Sep. 10, 2003, pp. 1-75.
VESA Mobile Display Digital Interface, Proposed Standard, Version 1P, Draft 11, Sep. 10, 2003, pp. 76-150.
VESA Mobile Display Digital Interface, Proposed Standard, Version 1P, Draft 13, Oct. 15, 2003. pp. 1-75.
VESA Mobile Display Digital Interlace, Proposed Standard: Version1P, Draft 14, Oct. 29, 2003, pp. 1-75.
International search report PCT/US05/042414—International Search Authority—US May 23, 2007.
Written Opinion PCT/US05/042643, International Search Authority US, Oct. 5, 2006.
International search report and Written Opinion—PCT/US05/042413, International Search Authority—European Patent Office—Aug. 25, 2008.
International Search Report and Written Opinion—PCT/US05/042412, International Search Authority—European Patent Office—Jul. 8, 2008.
International Search Report and Written Opinion—PCT/US05/042415, International Search Authority—European Patent Office—Nov. 8, 2006.
Written Opinion—PCT/US05/042436—International Search Authority—US Oct. 2, 2006.
European Search Report—EP05852048, Search Authority—The Hague Patent Office, Nov. 18, 2010.
European Search Report—EP10172872, Search Authority—Munich Patent Office, Dec. 17, 2010.
European Search Report—EP10172878, Search Authority—Munich Patent Office, Dec. 17, 2010.
European Search Report—EP10172882, Search Authority—Munich Patent Office, Dec. 29, 2010.
European Search Report—EP10172885, Search Authroity—Munich Patent Office, Dec. 23, 2010.
Hopkins, K. et al.: "Display Power Management," IP.COM Journal; IP.COM Inc., West Henrietta, NY (Mar. 1, 1995), XP013103130, ISSN: 1533-0001, vol. 38 No. 3 pp. 425-427.
Masnick, B. et al., "On Linear Unequal Error Protection Codes" IEEE Transactions on Information Theory, vol. IT-3, No. 4, Oct. 1967, pp. 600-607.
"Universal Serial Bus Specification—Revision 2.0: Chapter 9—USB Device Framework," Universal Serial Bus Specification, Apr. 27, 2000, pp. 239-274, XP002474828.
VESA: VESA Mobile Display Digital Interface Standard: Version 1. Milpitas, CA (Jul. 23, 2004), pp. 87-171.
Taiwan Search Report—TW94141285—TIPO—Nov. 6, 2011.
3GPP2 C.S0047-0. "Link-Layer Assisted Service Options for Voice-over-IP: Header Remover (SO60) and Robust Header Compression (SO61)," Version 1.0, Apr. 14, 2003, pp. 1-36.
STMicroelectronics: "STV0974 Mobile Imaging DSP Rev.3", Datasheet internet, (Nov. 30, 2004), XP002619368. Retrieved from the Internet: URL: http://pdf1.alldatasheet.com/datasheet-pdf/view/112376/STMICROELECTRONICS/STV0974.html [retrieved on Jan. 27, 2011], pp. 1-69.
"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard.
"Nokia 6255", Retrieved from the Internet: URL: http://nokiamuseum.com/view.php"model=6255 [retrieved on Feb. 4, 2012], 2 pgs.
Taiwan Search Report—TW094141287—TIPO—May 5, 2012.
Taiwan Search Report—TW093133101—TIPO—Feb. 2, 2012.
"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard, Dec. 1996.
IEEE STD 1394B; IEEE Standard for High Performance Serial Bus-Amendment 2 (Dec. 2002).
"Transmission and Multiplexing; High Bit Rate Digital Subscriber. Line (HDSL) Transmission Systerrion Metallic Local Lines; HDSL Core Specification and Applications for 2 048 Kbit/S Based Access Digital Sections; ETR 152" European Telecommunications Standard, Dec. 1996.
Supplementary European Search Report—EP05852044—Search Authority—The Hague—May 17, 2011.
Taiwan Search Report—TW102105227—TIPO—Aug. 1, 2014.

\* cited by examiner

DIGITAL DATA INTERFACE DEVICE

CROSS REFERENCE TO RELATED APPLICATIONS

The present application claims priority under 35 U.S.C. 119 to U.S. Provisional Application No. 60/630,853, entitled MDDI Host Core Design, filed Nov. 24, 2004; U.S. Provisional Application No. 60/631,549, entitled Mobile Display Digital Interface Host Camera Interface Device, filed Nov. 30, 2004; U.S. Provisional Application No. 60/632,825, entitled Camera MDDI Host Device, filed Dec. 2, 2004; U.S. Provisional Application No. 60/632,852, entitled MDDI Host Core and Pathfinder, filed Dec. 2, 2004; U.S. Provisional Application No. 60/633,071, entitled MDDI Overview, filed Dec. 2, 2004; and U.S. Provisional Application No. 60/633,084, entitled MDDI Host Core Pad Design, all of which are hereby expressly incorporated by reference herein in their entireties.

The present application is also related to commonly assigned U.S. patent application Ser. No. 11/285,389, entitled Digital Data Interface Message Format, filed on Nov. 23, 2005 and U.S. patent application Ser. No. 11/285,397, entitled Double Rate Serial Encoder, filed on Nov. 23, 2005, now U.S. Pat. No. 7,315,265, both of which are hereby expressly incorporated by reference herein in their entireties.

BACKGROUND OF THE INVENTION

1. Field of the Invention

The present invention relates generally to data communications. More particularly, the invention relates to a digital data interface device.

2. Background

Computers, mobile telephones, mobile telephone cameras and video capture devices, personal data assistants, electronic game related products and various video technologies (e.g., DVD's and high definition VCRs) have advanced significantly over the last few years to provide for capture and presentation of increasingly higher resolution still, video, video-on-demand, and graphics images. Combining such visual images with high quality audio data, such as CD type sound reproduction, DVDs, and other devices having associated audio signal outputs, creates a more realistic, content rich, or true multimedia experience for an end user. In addition, highly mobile, high quality sound systems and music transport mechanisms, such as MP3 players, have been developed for audio only presentations to users.

The explosion of high quality data presentation drove the need to establish specialized interfaces that could transfer data at high data rates, such that data quality was not degraded or impaired. One such interface is a Mobile Display Digital Interface (MDDI), used, for example, to exchange high speed data between the lower and upper clamshells of a cellular telephone that has a camera. MDDI is a cost-effective, low power consumption, transfer mechanism that enables very-high-speed data transfer over a short-range communication link between a host and a client. MDDI requires a minimum of just four wires plus power for bi-directional data transfer that delivers a maximum bandwidth of up to 3.2 Gbits per second.

In one application, MDDI increases reliability and decreases power consumption in clamshell cellular telephones by significantly reducing the number of wires that run across a handset's hinge to interconnect the digital baseband controller with an LCD display and/or a camera. This reduction of wires also allows handset manufacturers to lower development costs by simplifying clamshell or sliding handset designs.

While MDDI and other data interfaces can be used to efficiently provide high speed data rates across interfaces, interface systems that exchange data received over an MDDI or other data interface link are often slow and not optimized for a particular application, such as, for example, processing camera images and control data to be exchanged between the lower and upper clamshell portions of a cellular telephone.

What is needed is a digital data device interface to provide efficient processing of data gathered and exchanged over an MDDI or other high speed link.

SUMMARY OF THE INVENTION

The present invention provides a digital data interface device for transferring digital presentation data at a high rate over a communication link.

The digital data interface device includes a message interpreter, content module and a control module. The message interpreter module receives and interprets commands from and generates response messages through the communication link to a system controller, interprets the messages, and routes the information content of the commands to an appropriate module within the digital data interface device. The content module receives data from a peripheral device, stores the data and transfers the data to the system controller through the communication link. The control module receives information from the message interpreter, and routes information to a control block of the peripheral device.

In one example, the digital data interface device includes an MDDI link controller. The digital data interface device can be used to control a peripheral device, such as a camera, bar code reader, image scanner, audio device or other sensor. In one particular example, a cellular telephone having a camera with an MDDI link and a digital data device interface is provided.

Further embodiments, features, and advantages of the invention, as well as the structure and operation of the various embodiments of the invention are described in detail below with reference to the accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
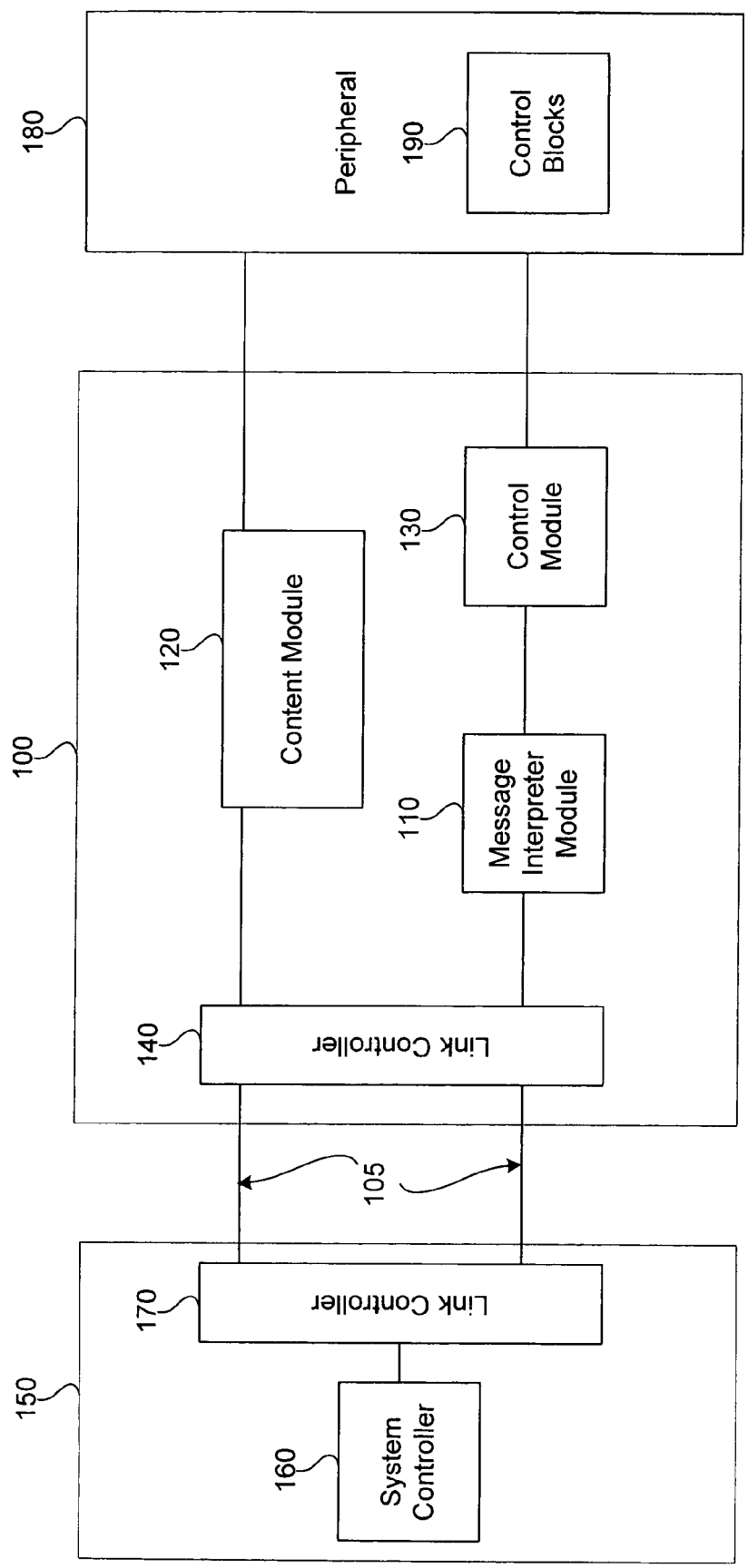
FIG. 1 is a diagram of a digital data device interface coupled to a digital device and a peripheral device.

FIG. 1 is a diagram of a digital data device interface 100 coupled to a digital device 150 and a peripheral device 180. Digital device 150 can include, but is not limited to, a cellular telephone, a personal data assistant, a smart phone or a personal computer. In general digital device 150 can include digital devices that serve as a processing unit for digital instructions and the processing of digital presentation data. Digital device 150 includes a system controller 160 and a link controller 170.

Peripheral device 180 can include, but is not limited to, a camera, a bar code reader, an image scanner, an audio device, and a sensor. In general peripheral 180 can include audio, video or image capture and display devices in which digital presentation data is exchanged between a peripheral and a processing unit. Peripheral 180 includes control blocks 190. When peripheral 180 is a camera, for example, control blocks 190 can include, but are not limited to lens control, flash or white LED control and shutter control.

Digital presentation data can include digital data representing audio, image and multimedia data.

Digital data interface device 100 transfers digital presentation data at a high rate over a communication link 105. In one example, an MDDI communication link can be used which supports bi-directional data transfer with a maximum bandwidth of 3.2 Gbits per second. Other high rates of data transfer that are higher or lower than this example rate can be supported depending on the communications link. Digital data interface device 100 includes a message interpreter module 110, a content module 120, a control module 130 and a link controller 140.

Link controller 140, which is located within digital data interface 100, and link controller 170, which is located within digital device 150 establish communication link 105. Link controller 140 and link controller 170 may be MDDI link controllers.

The Video Electronics Standards Association ("VESA") MDDI Standard describes the requirements of a high-speed digital packet interface that lets portable devices transport digital images from small portable devices to larger external displays. MDDI applies a miniature connector system and thin flexible cable ideal for linking portable computing, communications and entertainment devices to emerging products such as wearable micro displays. It also includes information on how to simplify connections between host processors and a display device, in order to reduce the cost and increase the reliability of these connections. Link controllers 140 and 170 establish communication path 105 based on the VESA MDDI Standard.

U.S. Pat. No. 6,760,772, entitled Generating and Implementing a Communication Protocol and Interface for High Data Rate Signal Transfer, issued to Zou et al. on Jul. 6, 2004 ('772 Patent") describes a data interface for transferring digital data between a host and a client over a communication path using packet structures linked together to form a communication protocol for presentation data. Embodiments of the invention taught in the '772 Patent are directed to an MDDI interface. The signal protocol is used by link controllers, such as link controllers 140 and 170, configured to generate, transmit, and receive packets forming the communications protocol, and to form digital data into one or more types of data packets, with at least one residing in the host device and being coupled to the client through a communications path, such as communications path 105. The interface provides a cost-effective, low power, bi-directional, high-speed data transfer mechanism over a short-range "serial" type data link, which lends itself to implementation with miniature connectors and thin flexible cables. An embodiment of link controllers 140 and 170 establishes communication path 105 based on the teachings of the '772 Patent. The '772 Patent is herein incorporated by reference in its entirety.

Furthermore, the host includes one of several types of devices that can benefit from using the present invention. For example, a host could be a portable computer in the form of a handheld, laptop, or similar mobile computing device, such as is depicted in as digital device 150. It could also be a Personal Data Assistant (PDA), a paging device, or one of many wireless telephones or modems. Alternatively, a host device could be a portable entertainment or presentation device such as a portable DVD or CD player, or a game playing device.

The host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance such as a refrigerator that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables.

At the same time, a client could comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved.

However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

The inventive MDDI and communication signal protocol may be used to simplify the interconnect between a host processor, controller, or circuit component (for example), and a display within a device or device housing or structure (referred to as an internal mode) in order to reduce the cost or complexity and associated power and control requirements or constraints of these connections, and to improve reliability, not just for connection to or for external elements, devices, or equipment (referred to as an external mode).

Wireless communication devices each have or comprise apparatus such as, but not limited to, a wireless handset or telephone, a cellular telephone, a data transceiver, or a paging or position determination receiver, and can be hand-held, or portable as in vehicle mounted (including cars, trucks, boats, trains, and planes), as desired. However, while wireless communication devices are generally viewed as being mobile, it is also understood that the teachings of the invention are applicable to "fixed" units in some configurations. In addition, the teachings of the invention are applicable to wireless devices such as one or more data modules or modems which may be used to transfer data and/or voice traffic, and may communicate with other devices using cables or other known wireless links or connections, for example, to transfer information, commands, or audio signals. In addition, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as 'users' and 'mobiles' in some communication systems, depending on preference.

In the context of wireless devices, the present invention can be used with wireless devices that uses a variety of industry standars, such as, but not limited to cellular Analog Advanced Mobile Phone System (AMPS), and the following digital cellular systems: Code Division Multiple Access (CDMA) spread spectrum systems; Time Division Multiple Access (TDMA) systems; and newer hybrid digital communication systems using both TDMA and CDMA technologies. A CDMA cellular system is described in the Telecommunications Industry Association/Electronic Industries Association (TIA/EIA) Standard IS-95. Combined AMPS & CDMA systems are described in TIA/EIA Standard IS-98. Other communications systems are described in the International Mobile Telecommunications System 2000/Universal Mobile Telecommunications System or IMT-2000/UM standards, covering what are commonly referred to as wideband CDMA (WCDMA), cdma2000 (such as cdma2000 1x-rxtt cdma2000 1x, 3x, or MC standards, for example) or TD-SCDMA. Satellite based communication systems also utilize these or similar known standards.

In other embodiments, link controllers 140 and 170 can both be a USB link controller or they both can include a combination of controllers, such as for example, an MDDI link controller and another type of link controller, such as, for example, a USB link controller. Alternatively, link controllers 140 and 170 can include a combination of controllers, such as an MDDI link controller and a single link for exchanging acknowledgement messages between digital data interface device 100 and digital device 150. Link controllers 140 and 170 additionally can support other types of interfaces, such as an Ethernet or RS-232 serial port interface. Additional interfaces can be supported as will be known by individuals skilled in the relevant arts based on the teachings herein.

Figure 2:
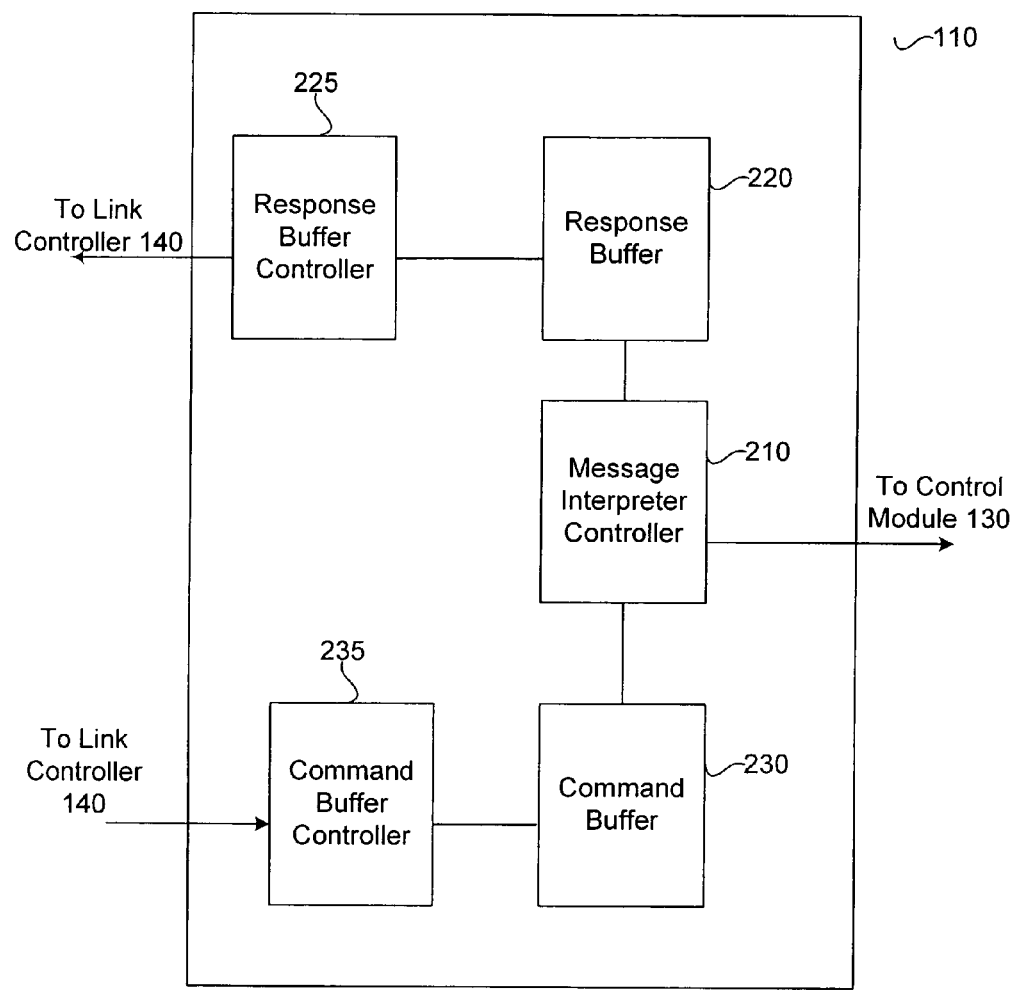
FIG. 2 is a diagram of a message interpreter module.

Within digital data interface device 100, message interpreter module 110 receives commands from and generates response messages through communication link 105 to system controller 160, interprets the command messages, and routes the information content of the commands to an appropriate module within digital data interface device 100. FIG. 2 shows details of the architecture and functions of message interpreter module 110.

Specifically, referring to FIG. 2, message interpreter module 110 includes a message interpreter controller 210, a response buffer 220 and a command buffer 230.

Message interpreter controller 210 reads and interprets incoming messages, generates register access and generates response messages.

Incoming messages, for example, include instructions from digital device 150 to control peripheral 180. Response messages may include acknowledgement messages back to digital device 150 that an instruction was executed or not. Response messages can also include requests to read data from peripheral 180 and unsolicited control commands to digital device 150.

Response buffer 220 is coupled to message interpreter controller 210 and buffers response messages. A response buffer controller 225 can be coupled between response buffer 220 and link controller 140 to regulate the flow of outgoing response messages to link controller 140.

Command buffer 230 is also coupled to message interpreter controller 210 and buffers incoming command messages. A command buffer controller 235 can be coupled between command buffer 230 and link controller 140 that regulates the flow of incoming command messages received from link controller 140. Command buffer controller 235 also identifies a valid command message and detects a new transaction within the valid command message. Command buffer controller 235 includes an error detection mechanism that examines a predefined unique identifier associated with a command message to detect one or more missing parts within a particular command message or within a set of command messages. In an example implementation the predefined unique identifier includes a single bit at the start of a command message.

Figure 3:
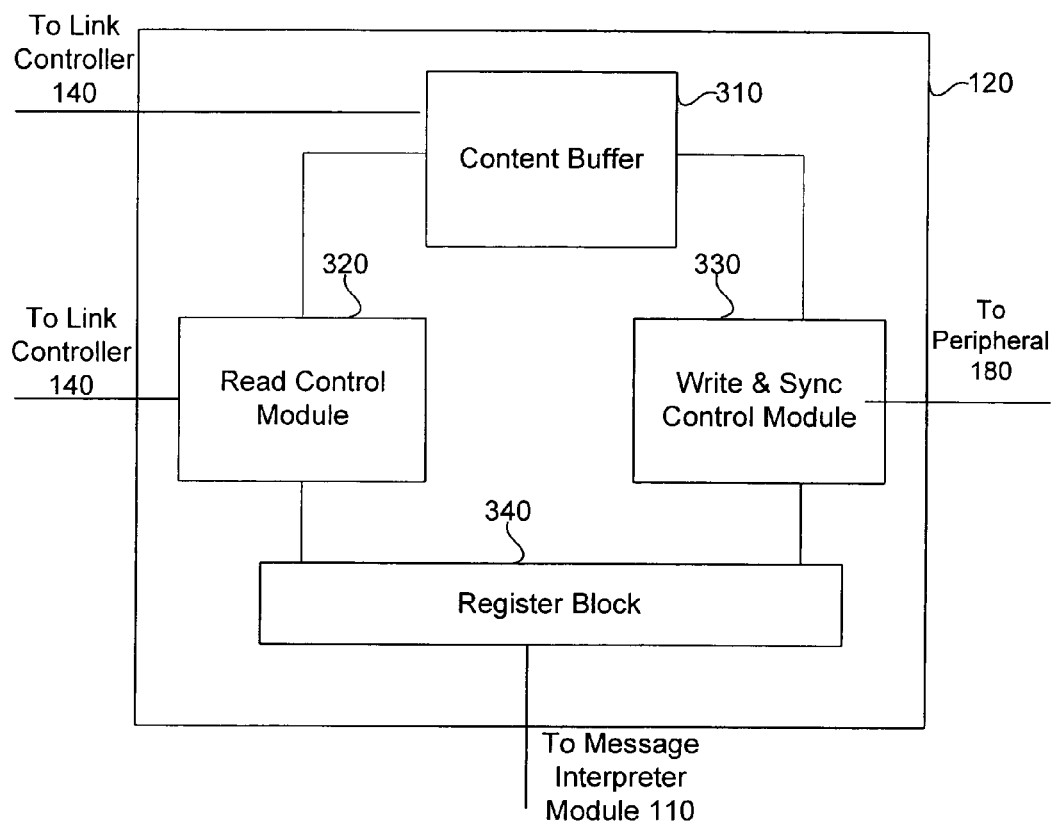
FIG. 3 is a diagram of a content module.

Referring back to FIG. 1, content module 120 receives data from peripheral device 180, stores the data and transfers the data to system controller 160 through communication link 105. FIG. 3 shows further details of the architecture and function of content module 120.

Referring to FIG. 3, content module 120 includes a content buffer 310, a read control module 320, a write and sync control module 330 and a register block 340. Content buffer 310 stores data that has been received from peripheral device 180.

Read control module 320 manages the transfer of data from content buffer 310 to link controller 140. For example, read control module 320 can receive a request for data from digital device 150 over link controller 140. Read control module 320 can provide messages to digital device 150 indicating the size of the data and whether data is ready to be sent. When data is available, data can then either be transferred directly from content buffer 310 or directly through read control module 320.

Write and sync control module 330 manages the flow of data from peripheral device 180 to content buffer 310. Write and sync control module 330 includes a means for selectively writing some or all of the data received from peripheral device 180 to content buffer 310. Write and sync control module 330 also includes a means for examining sync pulses contained within received data to determine one or more data boundaries for distinguishing content. Additionally, write and sync module 330 can include a means for inserting timing information into data.

Register block 340 stores operational parameters that affect the behavior of at least one of content buffer 310, read control module 320 and write and sync control module 330. Register block 340 can also be coupled to message interpreter module 110 for receiving operational parameters. For example, register block 340 can store video data masks that can be used for decimation of a video signal or frame when peripheral device 180 is a camera. Similarly, operational parameters can include instructions for sub-sampling within frames and lines of a video signal, as well as instructions used to determine edges of a video signal. Parameters can also include pixels per line and window height and width information that is then used to dictate the behavior of write and sync control module 330 and read control module 320.

Figure 4:
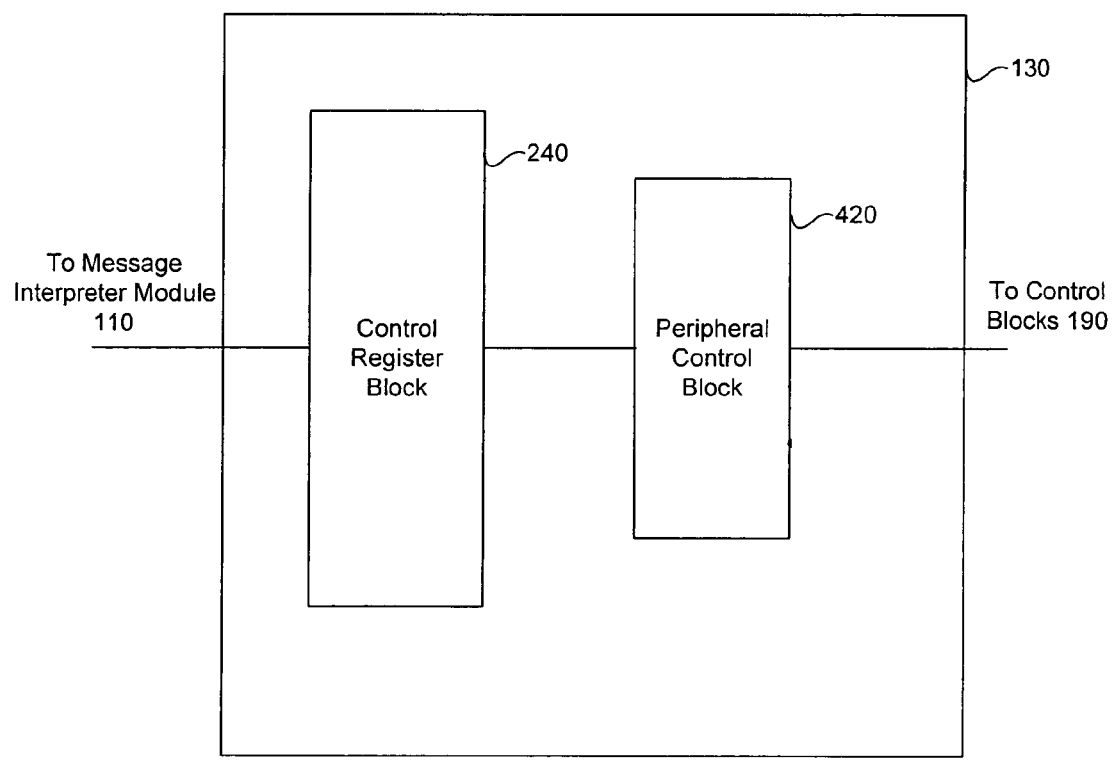
FIG. 4 is a diagram of a control module.

Referring back to FIG. 1, control module 130 receives information from message interpreter 130, and routes information to control blocks 190 of peripheral device 180. Control module 130 can also receive information from control blocks 190 and routes the information to the message interpreter module 110. FIG. 4 shows further details of the architecture and function of control module 130.

Referring to FIG. 4, control module 130 includes a control register block 410 and a peripheral control block 420. Control register block 410 contains registers that provide the control instructions for peripheral control block 420. Control register block 410 is coupled between message interpreter module 110 and peripheral control block 420. Peripheral control block 420 gathers peripheral control information from control register block 410 and uses that information to control peripheral device 180. For example, when peripheral device 180 is a camera, peripheral control block 420 can include control blocks for flash or white LED control, shutter and exposure control, lens control and master control of the camera.

Figure 5:
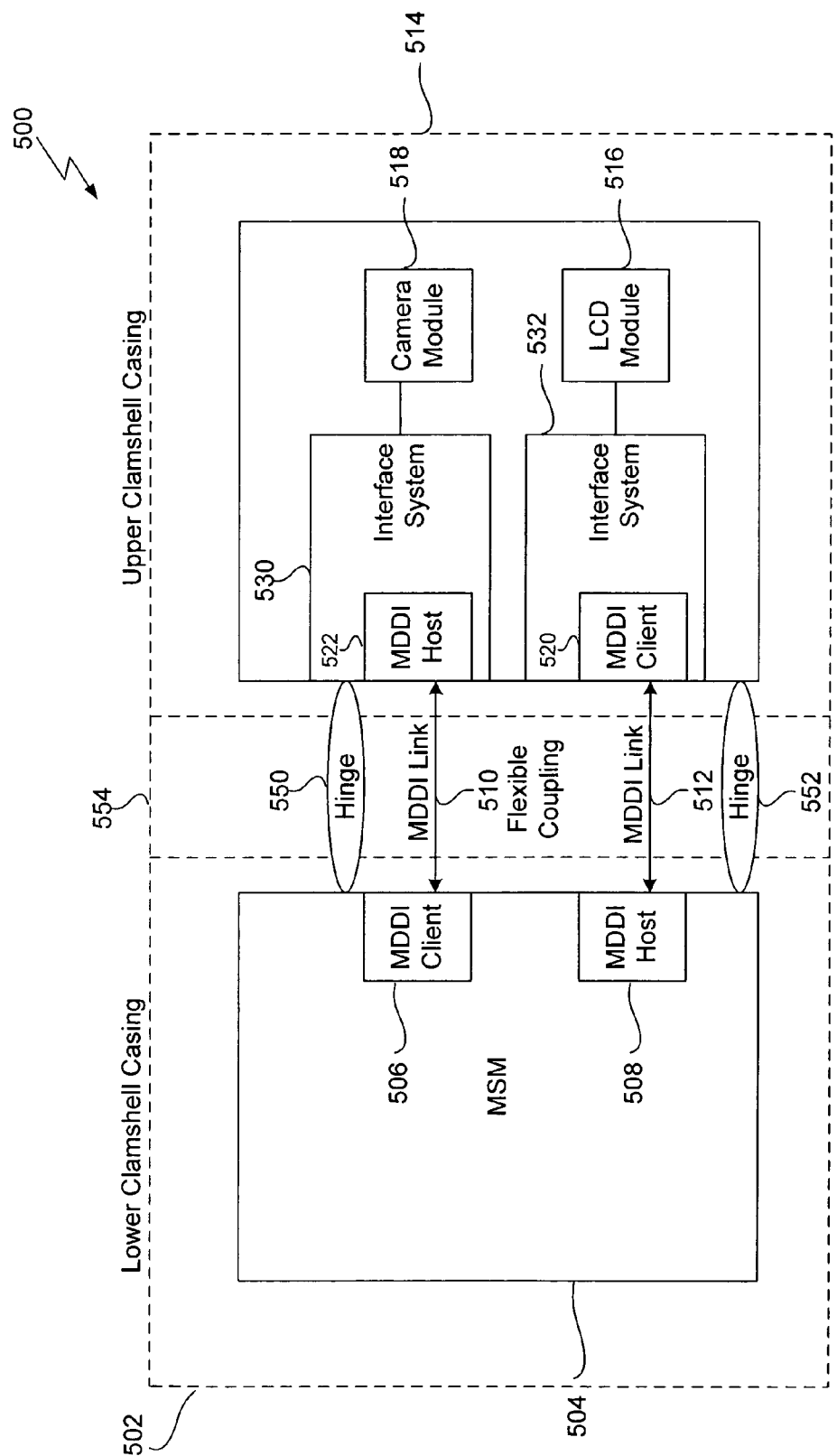
FIG. 5 is a diagram of a cellular telephone having upper and lower clamshell sections that uses an MDDI interface to provide high speed data communications between electronics located in the upper and lower clamshells.

FIG. 5 is a block diagram of a cellular telephone 500 having upper and lower clamshell sections that uses an MDDI interface to provide high speed data communications between components located in the upper and lower clamshells. The following discussion related to cellular telephone 500 provides an illustrative example that further shows the utility of digital data interface device 100 and provides additional details related to its implementation and use. Based on the discussions herein, use of a digital data interface device 100 with other devices, for example, a personal digital assistant and other types of mobile phones, will be apparent and are within the spirit and scope of the invention.

Referring to FIG. 5, a lower clamshell section 502 of cellular telephone 500 includes a Mobile Station Modem (MSM) baseband chip 104. MSM 104 is a digital baseband controller. The invention is not limited to use with MSM baseband chip 504. In other embodiments, MSM baseband chip 504 could be another type of baseband processor, programmable digital signal processors (DSPs), or controllers. An upper clamshell section 514 of cellular telephone 500 includes a Liquid Crystal Display (LCD) module 516 and a camera module 518. Both lower clamshell section 502 and upper clamshell section 514 are encased in plastic as is typically used with cellular phones. Hinges 550 and 552 mechanically connect lower clamshell 502 to upper clamshell 514. Flexible coupling 554 provides electrical coupling between lower clamshell 502 and upper clamshell 514.

MDDI link 510 connects camera module 518 to MSM 504. In an embodiment, an MDDI link controller is provided for each of camera module 518 and MSM 504. Within cellular telephone 500, for example, an MDDI Host 522 is integrated into interface system 530 which is coupled to camera module 512, while an MDDI Client 506 resides on the MSM side of the MDDI link 510. In an embodiment, the MDDI host is the master controller of the MDDI link.

In cellular telephone 500 pixel data from camera module 518 are received and formatted into MDDI packets by interface system 530 using MDDI Host 522 before being transmitted onto MDDI link 510. MDDI client 506 receives the MDDI packets and re-converts them into pixel data of the same format as generated by camera module 518. The pixel data are then sent to an appropriate block in MSM 504 for processing.

Similarly, MDDI link 512 connects LCD module 516 to MSM 504. MDDI link 512 interconnects an MDDI Host 508, integrated into MSM 504, and an MDDI Client 520 integrated into interface system 532 which is coupled to LCD module 516. Display data generated by a graphics controller of MSM 504 are received and formatted into MDDI packets by MDDI Host 508 before being transmitted onto MDDI link 512. MDDI client 520 receives the MDDI packets and re-converts them into display data and processes the display data through interface system 532 for use by LCD module 516. In an alternative embodiment, camera module 518 and LCD module 516 can use the same MDDI link, instead of using separate MDDI links, such as MDDI link 510 and 512 as shown in FIG. 5.

Interface systems 530 and 532 represent different embodiments of digital data device interface 100. In the case of interface system 530, digital data device interface 100 elements will be implemented to support data transfer of camera images and camera control functions for a camera. In the case of interface system 532, digital data device interface 100 elements will be implemented to support data display to an LCD and control functions for the LCD. Interface system 530 is further explained to illustrate an embodiment of digital data device interface 100 when used in a cellular telephone with a camera, such as cellular telephone 500 with camera module 518.

The relationship between the devices in FIG. 1 and cellular telephone 500 is as follows. Digital data device interface 100 is represented by interface system 530. Link controller 140 is represented by MDDI Host 522. Peripheral 180 is represented by camera module 518. System controller 160 is represented by MSM 504 and link controller 170 is represented by MDDI client 506.

Figure 6:
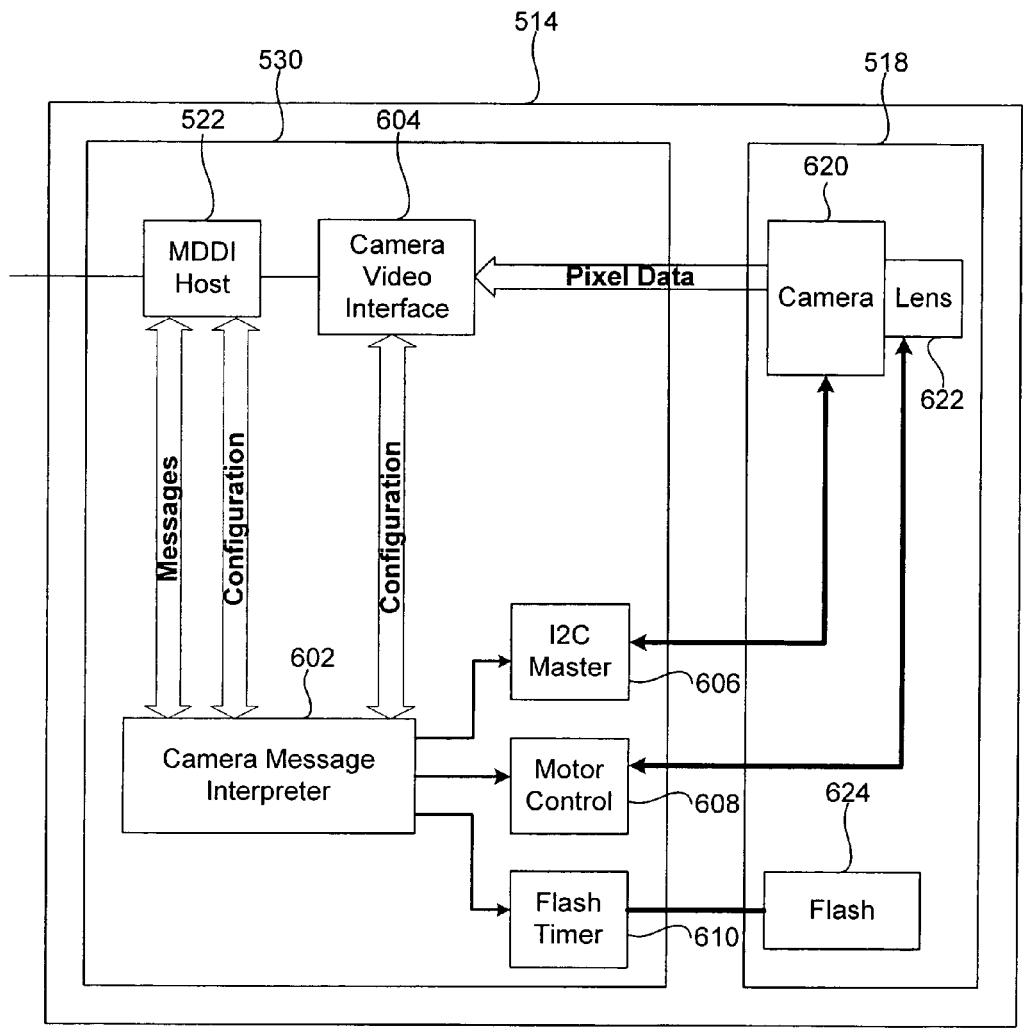
FIG. 6 is a diagram of the upper clamshell of a cellular telephone having a camera that uses an MDDI interface.

FIG. 6 is a diagram of upper clamshell 514 and provides further details related to interface system 530 to highlight the example embodiment of digital data device interface 100 as used within a cellular telephone with a camera. Interface system 530 includes MDDI host 522, camera message interpreter 602, camera video interface 604, I2C master 606, motor control 608 and flash/white LED timer 610. The I2C bus is a commonly used control bus that provides a communication link between circuits. The I2C bus was developed by Philips Electronics N.V. in the 1980s.

Recall that interface system 530 corresponds to digital data device interface 100. The components of interface system 530 correspond to the components of digital data device interface 100 in the following manner. Camera message interpreter 602 corresponds to message interpreter module 100. Camera video interface 604 corresponds to content module 120. Collectively, I2C master 606, motor control 608 and flash/white LED timer 610 correspond to control module 130.

Camera message interpreter 602 receives commands and generates response messages through MDDI host 522 to MSM 504. Camera message interpreter 602 interprets the messages and routes the information content to the appropriate block within interface system 530, which can be referred to as an MDDI camera interface device. Camera video interface 604 receives image data from camera 620, stores the image data, and transfers the image data to MDDI host 522. Collectively, I2C master 606, motor control 608 and flash/white LED timer 610 form a camera control block. In this case I2C master 606 provide controls for managing camera 620, motor control 608 provides controls for managing lens 622 (e.g., lens zoom functions), and flash/white LED timer 610 provides controls for managing flash/white LED 624 (e.g., flash brightness and duration.)

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A digital data interface device for transferring digital presentation data at a high rate over a communication link, comprising:

a message interpreter module that receives commands from and generates response messages through the communication link to a system controller, interprets the messages, and routes the information content of the commands to an appropriate peripheral module within the digital data interface device, wherein the commands comprise camera control functions, wherein the message interpreter module comprises a message interpreter controller that interprets and generates messages;

a response buffer coupled to said message interpreter controller that buffers response messages;

a command buffer coupled to said message interpreter controller that buffers incoming command messages;

a command buffer controller coupled between said command buffer and the communication link that regulates a flow of incoming command messages from the communication link, identifies a valid command message and detects a new transaction within the valid command message and wherein the command buffer controller further comprises an error detection mechanism that examines a predefined unique identifier associated with a command message to identify one or more missing parts of the command message; and a response buffer controller coupled between said response buffer and the communication link that regulates a flow of outgoing response messages to the communication link;

a content module that receives data from a camera, stores the data and transfers the data to the system controller through the communication link; and a control module that receives information from the message interpreter, and routes information to a control block of the camera.

2. A digital data interface device according to claim 1, wherein the control module receives information from the control block of the peripheral device and routes the information to the message interpreter module.

3. A digital data interface device according to claim 1, further comprising at least one communication link controller.

4. The digital data interface device according to claim 3, wherein said at least one communication link controller comprises an MDDI link controller.

5. The digital data interface device according to claim 3, wherein said at least one communications link controller comprises an MDDI link controller and a USB link controller.

6. The digital data interface device according to claim 3, wherein said at least one communications link controller comprises an MDDI link controller and a single link for exchanging acknowledgment messages.

7. The digital data interface device according to claim 3, wherein said at least one communications link controller comprises an MDDI link controller and at least one other link controller.

8. The digital data interface device according to claim 1, wherein said camera control functions comprise at least one member from the group consisting of a camera lens control, a flash control, a white LED control, an exposure control, and a shutter control.

9. A digital data interface device according to claim 1, wherein said content module comprises:

a content buffer that stores data;

a read control module that transfers data from the content buffer to the link controller;

a write and sync control module that manages the flow of data from the peripheral device to the content buffer; and a register block that stores operational parameters that affect the behavior of at least one member from the group consisting of the content buffer, the read control module and the write and sync control module.

10. A digital data interface device according to claim 9, wherein the write and sync control module further comprises: means for selectively writing some or all of the data received from the peripheral device to the content buffer.

11. A digital data interface device according to claim 9, wherein the write and sync control module further comprises: means for examining sync pulses contained within the data to determine one or more data boundaries.

12. A digital data interface device according to claim 9, wherein the write and sync control module further comprises: means for examining at least one of hsync and vsync pulses to determine one or more data boundaries.

13. A digital data interface device according to claim 12, wherein the write and sync control module further comprises: means for inserting timing information into the data.

14. A digital data interface device according to claim 9, wherein the register block is coupled to the message interpreter module to receive the operational parameters.

15. The digital data interface device according to claim 1, wherein said control module, comprises:
a peripheral control block coupled to the control block of the peripheral device that provides access to and control of the control block of the peripheral device; and
a control register block coupled to said peripheral control block that contains registers for said peripheral control block.

16. A digital data interface device for transferring digital presentation data at a high rate over a communication link, comprising:
a message interpreter module that receives commands from and generates response messages through the communication link to a system controller, interprets the messages, and routes an information content of the commands to an appropriate peripheral module within the digital data interface device, wherein the commands comprise camera control functions, wherein the message interpreter module comprises
a message interpreter controller that interprets and generates messages;
a response buffer coupled to said message interpreter controller that buffers response messages;
a command buffer coupled to said message interpreter controller that buffers incoming command messages;
a command buffer controller that comprises an error detection mechanism that examines a predefined unique identifier associated with a command message to detect one or more missing parts within a set of command messages wherein the command buffer controller is coupled between said command buffer and the communication link and regulates a flow of incoming command messages from the communication link, identifies a valid command message and detects a new transaction within the valid command message; and
a response buffer controller coupled between said response buffer and the communication link that regulates a flow of outgoing response messages to the communication link;
a content module that receives data from a camera, stores the data and transfers the data to the system controller through the communication link; and
a control module that receives information from the message interpreter module, and routes information to a control block of the camera.

17. A digital data interface device according to claim 16, wherein said unique identifier comprises a single bit at the start of a command message.

18. A digital data interface device according to claim 16, wherein the control module receives information from the control block of the peripheral device and routes the information to the message interpreter module.

19. A digital data interface device according to claim 16, further comprising at least one communication link controller.

20. The digital data interface device according to claim 19, wherein said at least one communication link controller comprises a MDDI link controller.

21. The digital data interface device according to claim 19, wherein said at least one communication link controller comprises a MDDI link controller and a USB link controller.

22. The digital data interface device according to claim 19, wherein said at least one communication link controller comprises a MDDI link controller and a single link for exchanging acknowledgment messages.

23. The digital data interface device according to claim 19, wherein said at least one communication link controller comprises a MDDI link controller and at least one other link controller.

24. The digital data interface device according to claim 16, wherein said camera control functions comprise at least one member from the group consisting of a camera lens control, a flash control, a white LED control, an exposure control, and a shutter control.

25. A digital data interface device according to claim 16, wherein said content module comprises:
a content buffer that stores data;
a read control module that transfers data from the content buffer to the link controller;
a write and sync control module that manages a flow of data from the peripheral device to the content buffer; and
a register block that stores operational parameters that affect the behavior of at least one member from the group consisting of the content buffer, the read control module and the write and sync control module.

26. A digital data interface device according to claim 25, wherein the write and sync control module further comprises: means for selectively writing some or all of the data received from the peripheral device to the content buffer.

27. A digital data interface device according to claim 25, wherein the write and sync control module further comprises: means for examining sync pulses contained within the data to determine one or more data boundaries.

28. A digital data interface device according to claim 25, wherein the write and sync control module further comprises: means for examining at least one of hsync and vsync pulses to determine one or more data boundaries.

29. A digital data interface device according to claim 28, wherein the write and sync control module further comprises: means for inserting timing information into the data.

30. A digital data interface device according to claim 25, wherein the register block is coupled to the message interpreter module to receive the operational parameters.

31. The digital data interface device according to claim 16, wherein said control module comprises:
a peripheral control block coupled to the control block of the peripheral device that provides access to and control of the control block of the peripheral device; and
a control register block coupled to said peripheral control block that contains registers for said peripheral control block.

* * * * *